Jan. 21, 1964 J. T. FEID 3,118,516
SOUND ABSORBING FILM FACED BOARDS OF MINERAL
FIBERS AND METHOD OF MAKING SAME
Filed Dec. 24, 1959 4 Sheets-Sheet 1
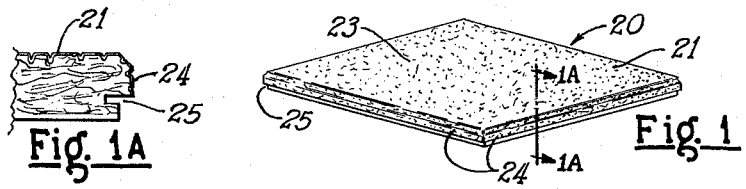
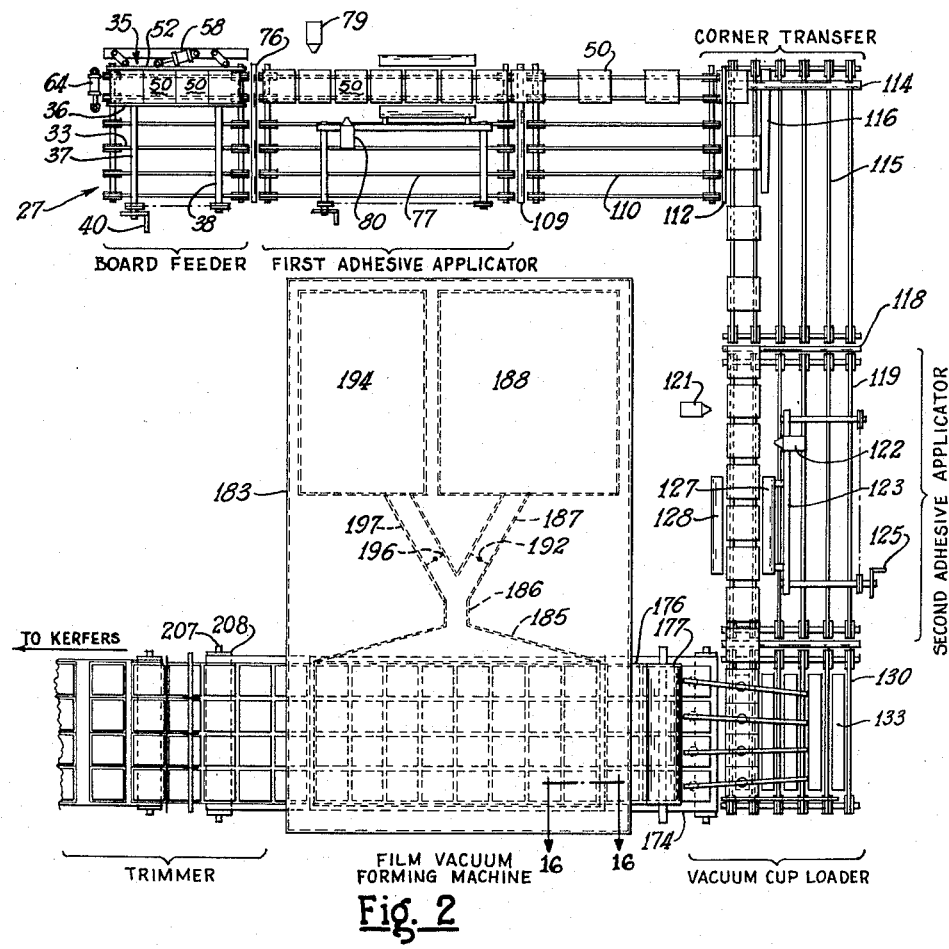
INVENTOR.
JACK T. FEID
ATTORNEYS INVENTOR.
JACK T. FEID
BY Staelin &Overman
ATTORNEYS Jan. 21, 1964  J. T. FEID  3,118,516
SOUND ABSORBING FILM FACED BOARDS OF MINERAL
FIBERS AND METHOD OF MAKING SAME
Filed Dec. 24, 1959  4 Sheets-Sheet 3

INVENTOR.
JACK T. FEID
BY *Staelin & Overman*
ATTORNEYS

INVENTOR.
JACK T. FEID
BY Staelin & Overman
ATTORNEYS

3,118,516
SOUND ABSORBING FILM FACED BOARDS OF MINERAL FIBERS AND METHOD OF MAKING SAME

Jack T. Feid, Granville, Ohio, assignor to Owens-Corning Fiberglas Corporation, a corporation of Delaware
Filed Dec. 24, 1959, Ser. No. 861,934
11 Claims. (Cl. 181—33)

This invention relates to film covered boards of bonded mineral fibers for installation in abutting series as wall or ceiling surfacing or structure. More particularly, the invention pertains to such boards having thermal insulating properties as well as effective sound absorption.

Boards of this invention are preferably composed of bonded, compressed masses of glass fibers. Such porous, low density bodies of fibrous glass are most effective in noise abatement due to the capacity of the myriad, minute communicating air cells in the maze of fibers to baffle and absorb sound waves. The tiny pockets of static air are also responsible for the high thermal insulating power of such fibrous masses.

These fibrous glass panels are conventionally supplied in various planar dimensions ranging from ten by ten inches for acoustical tile up to forty-eight by forty-eight inches for ceiling and form boards. The more common thicknesses are one-half and three-fourths of an inch, but the broader boards are occasionally used in thicknesses up to two inches. The noise reducing coefficient generally increases with thicknesses and will ordinarily lie within the range of .45 to .90.

These products are employed mostly in ceiling installations where they are attached by adhesives or are hung upon mechanical suspension systems. The large panels are also laid upon framework as form boards in roof construction where they carry poured-in-place gypsum decks generally two inches in depth.

From the standpoint of lightness and acoustical effectiveness of the boards, glass fibers of a diameter in the range between twelve and twenty-two hundred-thousands of an inch serve most satisfactorily. Fibers of still smaller diameters would enhance some properties of the products, while fibers of larger diameters, up to more than seventy hundred-thousands, give quite adequate results and may be more practical for some commercial purposes.

The size of the fibers is determined by the type and control of the forming equipment utilized. Such apparatus ordinarily employs air, steam, or combustion gases for attenuating molten threads of glass issuing from small orifices. However created, the fibers are collected at the forming station in blanket form with an uncured binder component dispersed therethrough.

A binder composed of a combination of melamine and phenol formaldehyde resins in a proportion of roughly one to two, has acceptable strength and fire resistant characteristics. Various other fibrous glass bonding agents are well known and would be quite equally effective. These include epoxy, urea, and polyester resins. The amount of binder may run between nine and twenty-six percent by weight of the finished panel, depending upon the balance desired between sturdiness and fire protection.

The blanket of fibers with the uncured binder dispersed therethrough is held compressed to the desired density in the final board while the binder is set by heat. The compressed mass is thus dimensionally stabilized. The density generally runs between eight and fifteen pounds per cubic foot with the average in the neighborhood of eleven pounds. The individual panels or boards are created by longitudinally slicing and cross-wise shearing the compressed fibrous blanket according to the selected measurements.

In order to admit sound, the surfaces of the resulting boards must be either of a porous nature or must be composed of a thin, unattached film with sufficient flexibility to vibrate and thus transmit sound waves to the interior of the panel. This plastic covering may be variously colored or be imprinted with a decorative pattern.

The smooth film is preferred over the other type of porous coverings because it is more easily washed and discourages dust accumulation. In contrast, the porous paint surfacings are inclined to disintegrate upon washing and to smudge easily.

In spite of the advantages of the film covering, the sales of such boards have been held back to some degree by the cost of the film material, by difficulties and cost of attaching it to the basic panel, and further by the slightly lower acoustical functioning which may arise from partial attachment, from the nature of the composition or because of the thickness of the film.

It is then a prime object of this invention to provide sturdy, film covered boards of bonded mineral fibers, and preferably of fibrous glass, having high acoustical properties and which may be produced more economically than prior products of this type.

A further object of the invention is to provide acoustical tiles or boards of improved appearance.

A still further object of the invention is to provide a method of producing such boards.

More specifically, it is an object of this invention to provide a film faced acoustical board in which the film lies smoothly around the corners thereof instead of being folded there around as in previously produced boards of this type.

Another object of the invention is to provide a method of forming a thermoplastic film cover, and attaching it to a board of fibrous glass utilizing a comparatively low temperature in combination with a heat activated adhesive deposited upon the edges of the board.

A further supplemental feature is to utilize suction through the edge portion of the board to draw the film against a porous coating of adhesive upon the edge portion.

These and other objects of the invention are attained by coating the side edges of the basic board with adhesive in a manner whereby at least some porosity is retained in the edge surfaces, laying a thin film of plastic over the basic panel, heating at least a portion of the film to a softened, but non-sticky condition, drawing the film, by air suction through the porous body of the board, against the face of the board and down against the sides thereof into attachment with the adhesive thereon, and cooling the film while it is so held.

The invention will be more fully explained hereafter with reference to the drawings in which:

FIGURE 1 is a perspective view of a small board for use as an acoustical tile with a film covering according to this invention;

FIGURE 1A is an enlarged section through an edge portion of the board of FIGURE 1, taken on the section line 1A—1A thereof;

FIGURE 2 is a diagrammatic, plan view of a production line adapted to apply film coatings to acoustical tiles and other boards of bonded fibrous glass in the practice of this invention;

Figure 3:
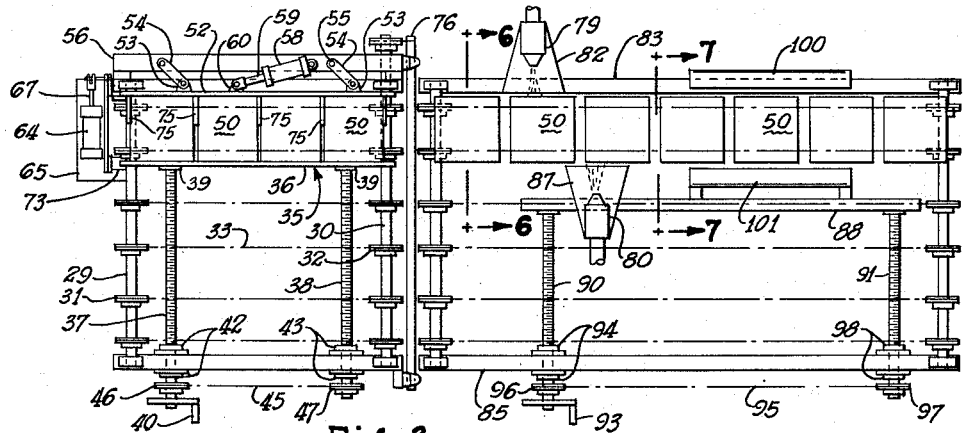
FIGURE 3 is an enlarged plan view of the starting end of the production line shown in FIGURE 2 including a panel blank or board feeder and a first adhesive applicator section.

Referring in more detail to the drawings, in FIGURE 1 is shown an acoustical tile 20 constructed according to this invention. This has a plastic film covering 21 which lies unattached, but closely associated with the main facing 23 of the tile, and is adherred along the edges 24 thereof. As shown the tile has a lower undercut border section with a groove 25 at its top. This contouring is obtained by grinding, sawing or by some other cutting operation. The portion of the film lying over this section is removed in the same operation. The groove 24 is provided for splines to align adjacent tiles and for flanges of supporting hangers. The indented section beneath the groove allows room between tiles for the flat portion of the hanger from which the flanges laterally project.

The production line diagrammatically illustrated in FIGURE 2 provides a method of applying a plastic film such as 21 to acoustical tiles or other compressed boards of bonded fibrous glass according to the practice of this invention.

At the start of the line, there is a board feeder unit 27. Enlarged views of this unit may be seen in FIGURES 3, 4 and 5. It includes a main supporting frame 28 near the top of which are mounted shafts 29 and 30. These respectively carry a series of sprockets 31 and 32 around which run spaced roller chains to serve as a conveyor 33.

Above the level of the conveyor is a magazine or hopper 35, one side plate 36 of which is mounted on the ends of threaded rods 37 and 38. The flanged ends of the rods rotatably fit within collars 39 fixed to the side plate 36. The lateral position of side plate 36 may be adjusted by turning the crank handle 40 on the end of rod 37 to which it is fixed. This axially advances or retracts rod 37 through its threaded engagement with the stationary nut 42.

The threaded rod or screw 38 is likewise advanced or retracted by being turned through the stationary threaded nut 43. The rotation of rod 38 is synchronized with the rotation of rod 37 through the action of chain 45 running around sprockets 46 and 47 mounted on the rods.

The boards 50 selected for illustration and explanation of the operation of the production line are twelve by twelve inches. This is a common size for acoustical tiles and close to the smallest which would normally be handled by the disclosed equipment. Such a compressed, resin bonded board has a preferred density of eleven and one-half pounds per cubic foot.

To fit boards of this size, the side plate 36 of the magazine has been positioned, by turning of the crank handle 40, to a distance of twelve inches from the opposite side plate 52 of the magazine. Alternately, plate 36 may be withdrawn sufficiently to accommodate boards as wide as forty-eight inches.

Ears 53, extending from the plate 52, are joined by pivotable links 54 to stationary posts 55 projecting upwardly from an off-set bracket 56 mounted on the main supporting frame 28. The side 52 is laterally shiftable through the action of air cylinder 58 which is also mounted on the off-set bracket 56. The piston rod 29 projecting from the cylinder is joined to the side plate 52 through a pin connection with ear 60.

Below the bottom edges of the side plates 36 and 52 of the magazine are a series of opposed fingers 62 and 63. These are reciprocably mounted from movement between an inner position where they project below boards 50 held within the magazine and an outward position in which they are withdrawn outside of the inner edges of the side plates 36 and 52. This movement is secured through the action of the cylinder 64 mounted on the rear platform 65 at the top of the angled support 66.

Piston rod 67 from the cylinder 64 is pivotably connected to a strap 68 which is swingably mounted at 69. The upper end of the strap 68 is connected to bar 70 which carries the fingers 62. A link 72 fastened at its lower end to the strap 67 is attached at its upper end to a bar 73 on which are mounted the fingers 63. Bar 73 is carried by an arm 74 swingably mounted on the supporting frame 28.

As illustrated, the magazine 35 is slightly more than forty-eight inches long and accordingly dimensioned to receive four contiguous stacks of the twelve by twelve inch boards. These are placed in the magazine by an operator, and at least 4 to 6 boards should be maintained at all times in each stack. Inwardly directed stack dividers 75 project from side plate 52 to define the ends of the magazine and to hold the stacks vertically aligned.

The opposed fingers 62 and 63 are first in their innermost position at which they are vertically in line to support the row of four stacks of boards. The fingers are spaced below the bottom edges of the side plates 36 and 52 slightly more than the individual thickness of the boards which in this case may be five-eighths of an inch.

When it is decided to start the movement of the boards from the magazine along the production line, the side plate 52 through the electrically controlled action of air cylinder 58 is pressed inwardly against and in retaining relation with the boards of the stacks with the exception of the lowermost board of each stack which is slightly below the edge of both side plate 52 and the opposing plate 36.

The fingers 62 and 63, which are now only supporting the bottom board of each stack, are drawn outwardly through the action of cylinder 64 which is controlled by suitable electrical devices and solenoid valving. This releases the bottom row of four single boards, one from each stack, and they drop down upon roller chain conveyor 33 positioned just below the fingers. After releasing the boards, the fingers are driven back into their inward position, and the movable side plate 52 is shifted outwardly to release the remaining boards and permit them to drop slightly to rest upon the fingers. With the side plates thus momentarily loosely confining the stacks of boards, a further supply of boards may be added by the operator to the four stacks.

For purposes of explanation, it will be considered that the conveyor 33 travels at an off and on rate of 110 feet per minute and that a row of four boards is released every three and one-fourth seconds in close array with preceding and following rows. To allow extra time for later steps in the operation of the production line after each set of eight rows or groups of boards are discharged from the magazine, there is a longer idling period of four seconds.

The four boards of each group or row are discharged by conveyor 33 in edge contacting relation across bridging roller 76 to the following roller chain 77 of the first adhesive applying section of the production line. This conveyor, in this instance, is driven about eight percent faster, or at the rate of one hundred and nineteen feet per minute, to draw the boards about an inch apart as they are deposited thereon.

A pair of opposed spray devices 79 and 80 are mounted above conveyor 77 and along opposite sides of the line of travel of the boards 50. Spray device 79 is held upon a stationary shielding bracket 82 which is fixed to the top rail 83 of the main supporting frame 85. The other spray device 80 is carried upon a similar shielding bracket 87. This in turn is fixed to the lower edge of the laterally shiftable bar 88, which is ported for the projection of the forward end of the spray device 80. This bar is held on the ends of threaded rods or screws 90 and 91 which are axially movable through turning of hand crank 93. Rod 90 is threadedly engaged through the stationary nut 94. Turning of rod 90, through chain 95 running between sprockets 96 and 97, rotates rod 91 which has threaded engagement through stationary nut 98. Bar 88 and the spray device 80 carried thereon may be thus properly positioned for boards of varying widths.

The spray devices 79 and 80 apply an adhesive upon the opposite parallel edges of the boards as the latter pass between the spray devices. The spacing of one inch between the boards prevents the adhesive from bridging between them. Timed controls momentarily deactivate the spray devices during the regular dwell period of the conveyor between the discharge from the magazine of successive groups of boards. This period is not much more than one second in length. The spraying action is also discontinued during the dwell period of four seconds between each set of eight groups.

The adhesive material is preferably of an elastomer cement type having a synthetic rubber base in a somewhat greater proportion of an ester or ketone solvent. It has high strength and excellent adhesion and is resistant to vinyl plasticizers, oil and other aliphatic hydrocarbons. The syrupy consistency does not promote ready atomization by the spray devices. However, this is of benefit in the practice of this invention as it is important that the adhesive either be of a porous nature or be applied unevenly so as to leave openings into the edges of the boards for the passage of air.

After receiving the air permeable edge coating of adhesive, the boards proceed past a pair of highly efficient and fast acting radiant heaters 100 and 101, positioned on opposite sides of the line of travel of the boards. Heater 100 is fixedly mounted upon a bracket 102 on the frame rail 83 while heater 101 is carried for lateral adjustment upon the shiftable bar 88. This flash heating treatment drives the major portion of the solvent constituent from the adhesive and leaves it without sufficient tackiness to cause trouble in subsequent handling operations. The adhesive is thus started toward a cured state and completion of this action must be accomplished without much delay as the open time of the material is rather short.

The setting of the adhesive is ordinarily secured through either air drying or heat curing. In the subject procedure, an intermediate method is followed in which moderate heat is successively employed to promote drying with a light curing action.

It is desirable to provide an exhaust hood over the spray devices and heaters to draw away light overspray and volatilized solvents.

Figure 4:
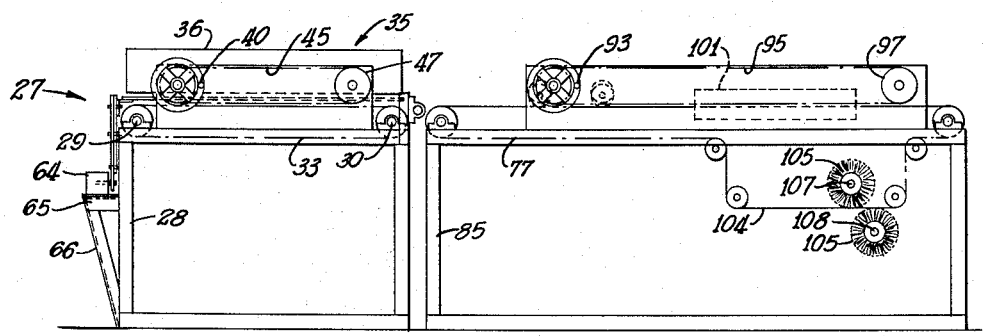
FIGURE 4 is a side elevation of the equipment shown in FIGURE 3.
Figure 5:
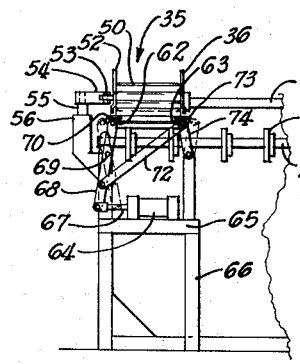
FIGURE 5 is an elevational end view of the equipment of FIGURE 3 with portions broken away.
Figure 6:
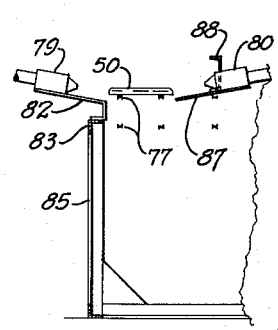
FIGURE 6 is a partial cross sectional view on the line 6—6 of FIGURE 3.
Figure 7:
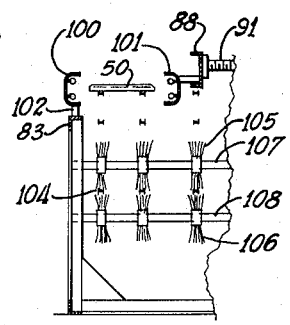
FIGURE 7 is a like section as viewed from the line 7—7 of FIGURE 3.
Figure 8:
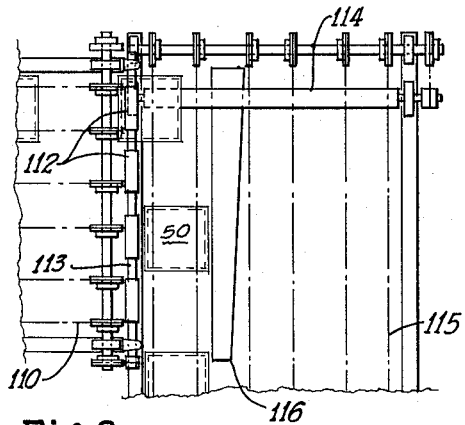
FIGURE 8 is a partial plan view showing the corner transfer mechanism for moving boards from one conveyor to a second conveyor running at right angles thereto.

To remove adhesive which is deposited upon the strands 104 of the chain conveyor 77, they are passed between a series of cleaning brushes 105 and 106 as shown in FIGURE 4. Brushes 105 and 106 are respectively mounted on rotating shafts 107 and 108.

The boards are discharged from conveyor 77 across the bridging roller 109 (shown only in FIGURE 2) to the first conveyor 110 of the corner transfer section of the production line. In order to pass the boards around this turn, it is necessary that they be spaced apart slightly more than their longitudinal dimension of twelve inches.

For this reason conveyor 110 travels at a speed fast enough to separate the boards this distance as they arrive from the conveyor 77. In this example this speed would be two hundred and thirty feet per minute. Being thus spaced, the boards are discharged from conveyor 110 between a series of rubber covered pinch rollers 112, mounted on rotating shafts 113; and when released thereby drop upon a steel roller 114, the axis of which is 90° from the axes of the pinch rollers.

Figure 9:
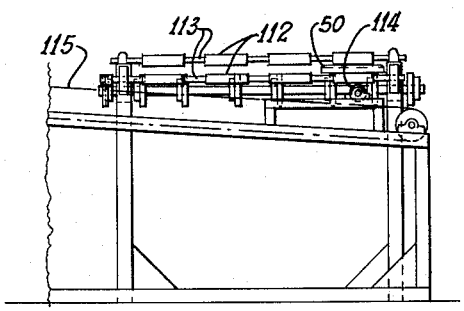
FIGURE 9 is an elevational view from the right hand side of the mechanism shown in FIGURE 8.

The second conveyor 115 of the corner transfer section is at right angles to conveyor 110. It slopes upwardly from below the steel roller 144 as may be seen in FIGURE 9 and receives the boards as they are propelled off the steel roller 114. This conveyor travels at the same speed as conveyor 110, and the spacing of the boards is thus maintained. The uncoated edges of the boards are now parallel to and facing the sides of the conveyor path.

To align the boards as they are carried upon conveyor 115, a straight guiding arm 116 is positioned along their path from underneath the steel roller 114. From conveyor 115 the boards are discharged across the bridging roller 118 to the conveyor 119 of the second adhesive applying section of the production line, as shown in FIGURE 2. The speed of this conveyor is the same of that of conveyor 77 of the first adhesive application section; and accordingly, the boards are brought together with a spacing of only one inch between them.

This second adhesive application section has the same elements as the first section and applies adhesive to the remaining pair of opposed and parallel edges of the boards. It includes the spray device 121 in a fixed position and an opposed spray device 122 mounted on a laterally shiftable bar 123. The position of this bar is controlled in the same manner as bar 88, through a manual crank 125. Also mounted on the bar 123 is a radiant heating unit 127 in opposed relation to the like fixedly mounted heated unit 128. Over this adhesive applying section, it is also desirable to place an exhaust hood to discharge overspray particles and solvent fumes.

From conveyor 119 the row of boards are discharged upon the conveyor 130 of the vacuum cup loading section of the production line. The boards are collected in a tight row of four on this conveyor behind a stop member 131.

Positioned below and between the V-belt strands of the conveyor 130 are a series of lifting slats 133. These are mounted on a pair of angled rocker arms 135 and 136. The rocker arms are pivotably supported upon a cross member 138 of the main supporting frame 139. Joint movement of the rocker arms 135 and 136 is secured through the link connection 141 between them.

The lower end of rocker arm 135 is pivotably connected to the piston rod 143 extending from the air cylinder 144. Through electrical controls including limit switch 145 tripped by the arrival of the first board against stop member 131, air cylinder 144 is motivated to drive piston rod 143 outwardly as soon as four boards are collected in a line on conveyor 130. This raises the lifting slat 133 beneath the row of boards (as well as the companion slats necessary for larger boards), and the boards are thus lifted upwardly into seizing contact with a series of vacuum cups 146.

For a row of boards of this size and number, there are four of these suction cups 146. They are supported by tubular couplings 147 through which air is drawn away from the cups by a vacuum pump and suitable piping which are not here shown.

The tubular couplings depend from the forward ends of four rack bars 149 which are supported and guided for longitudinal movement between opposite pairs of rollers 151 and 152. These rollers are mounted in frames 154 fixed to a channel iron 155 fastened to the top of the main frame 139.

Figure 10:
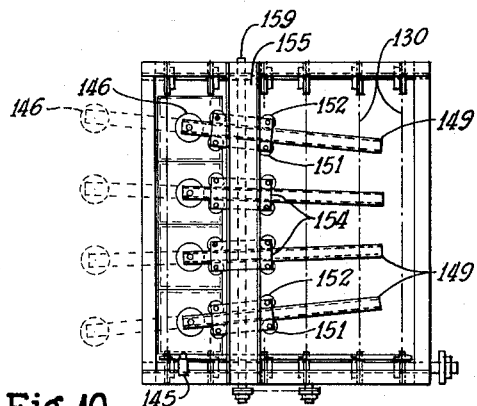
FIGURE 10 is a plan view of the vacuum cup loader unit.
Figure 11:
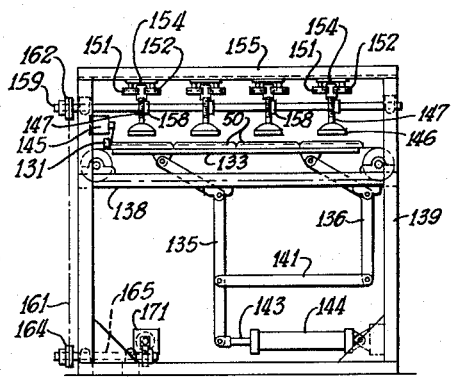
FIGURE 11 is a right hand elevation of the unit shown in FIGURE 10.
Figure 12:
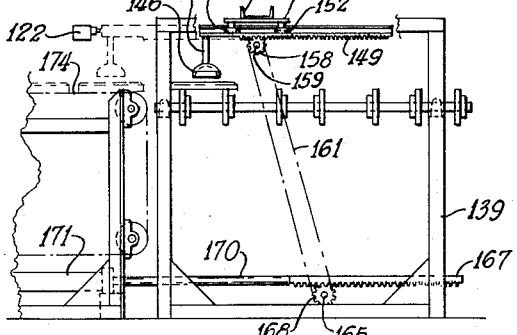
FIGURE 12 is a front elevational view of the loading unit of FIGURES 10 and 11.
Figure 13:
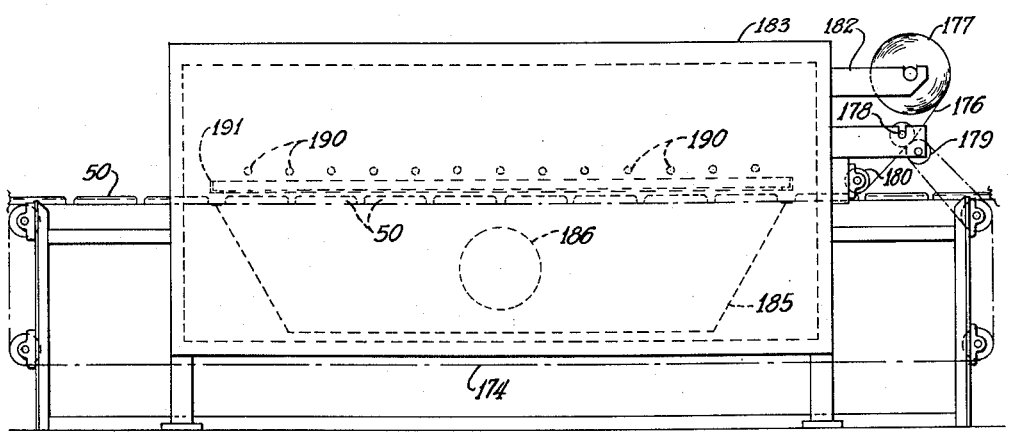
FIGURE 13 is a side elevation of the vacuum forming machine for drawing a plastic film down upon a series of boards.

Immediately upon seizure of the boards by the vacuum cups, the rack bars are advanced to the left as seen in FIGURES 10 and 12. This movement is secured through the action of pinions 158 engaging the teeth of the rack bars. These pinions are mounted upon a horizontal shaft 159 which is turned through the action of chain 161 running over a sprocket 162 at the end of the shaft 159. This chain is driven by a sprocket 164 at the end of shaft 165 mounted near the bottom of the frame 139. This shaft is turned by the engagement of a rack 167 with a pinion 168 on the opposite end of the shaft 165 from the sprocket 164. The rack is on the end of a piston rod 170 from cylinder 171.

The rack bars 149 are advanced along slightly diverging lines so as to laterally separate the boards which they carry so that they will be one inch apart at the end of the forward travel of the rack bars. This forward movement is terminated by the tripping of limit switch 122 by the end of one of the bars. The suction to the vacuum cups is also stopped by action of the limit switch as the bars arrive at their forward position and this releases the boards upon the conveyor 174 of the adjacent vacuum forming machine. This conveyor is a belt type composed of heat resistant synthetic rubber reinforced with steel wires, and has perforations one-eighth inch in diameter and spaced one inch apart from center to center.

Conveyor 174 is operated with a step-by-step movement with a travel of thirteen inches in each step for boards twelve inches square. For these boards, the time of each step may take about three and one-quarter seconds including a one second dwell period.

After dropping the first row of boards, the suction cups are immediately returned to their starting position and seize the next row of four boards which have collected on conveyor 130. This next row is then moved over upon the machine conveyor 174, one inch behind the preceding row which has been moved forward thirteen inches by the indexed movement.

Such placing of boards in cross-wise rows upon conveyor 174 continues until, for the particular equipment here disclosed, thirty-two individual boards of the cited dimensions have been placed on the conveyor in four longitudinal rows of eight boards each, and until this set of boards has reached the center forming station within the vacuum forming machine.

As the boards move into the machine, a plastic film 176 is laid thereover. This is drawn from a roll 177 by a pair of feed rollers 178 and 179 and is directed upon the boards by the guide roller 180. The roll 177 is supported in notches on supporting arms 182 extending from the forming machine housing 183.

A plastic film, especially adapted to this invention, is of an unplasticized polyvinyl chloride composition calendered to a two mil thickness. It possesses flexibility with a minimum of stretch, and contracts to a limited degree when heated. In addition, it is extremely tough, noncombustible, and chemically inert.

As soon as the set of thirty-two boards arrives in position within the forming machine, the movement of conveyor 174 is interrupted for a period, which in this example, is four seconds long.

In this short interval air suction is first applied to the under side of the boards and of the overlying film by air drawn from the lower chamber 185 through main piping 186 and branch conduit 187 to a tank 188 maintained in an evacuated condition by a suction pump connected therewith. The relative positions of these elements are indicated in FIGURE 2.

At the same time, an upwardly placed row of heating elements 190 are activated. This may be accomplished by moving them into position or through control of the current supply. Simultaneously, the frame 191 is brought down around the full set of thirty-two boards with its edge holding and sealing the film against the bordering portion of the conveyor.

Through the effect of the suction through the boards and through the edges thereof, the film which is slightly softened by the heat received from elements 190 is drawn down against the face of the boards as well as between the boards and against the edges thereof. A vacuum pressure around fourteen inches below atmospheric works very satisfactorily.

In the subject method, the natural stiffness of the polyvinyl chloride film is affected as slightly as possible through the use of heat at a fairly low temperature, well below the film heat sealing range of 260° to 400° F.

The film is softened sufficiently to stretch down around the corners of the boards under the influence of the suction, and the suction through the boards also draws the film down into conforming contact with the faces of the boards. However, the plastic film is not softened to a point of stickiness and does not therefore become definitely adhered to the faces of the boards.

However, the film does assume a stippled effect in shaping itself partially to the fibers in the facing surfaces of the boards. This provides an interesting texture considered valuable from a sales standpoint.

The hearing of the film which may be in a temperature range between 100 to 150° Fahrenheit acts with the residue of solvent in the adhesive on the edges of the boards to activate the adhesive, and to cause the film to be attached therethrough to the edges of the boards.

Almost instantaneously, the suction of the lower chamber 185 is broken by the automatic closing of the damper 192 in the branch conduit 187 and air under pressure is admitted to the lower chamber through the main piping 186. This air from compressed air reservoir 194 reaches branch conduit 197 following the opening of the damper 196.

This causes air to be discharged upwardly through the perforations of the conveyor 174 and through the boards to apply pressure against the film laying on top of the boards. This counteracts any tendency of the film to adhere to the faces of the board. This air movement also lifts upwardly from attachment to the conveyor 174 the portion of the film drawn down against the conveyor between boards. After the prescribed period of four seconds, the indexing movement of the conveyor 174 is re-initiated, and the set of thirty-two film coated boards proceeds out of the forming machine.

Meanwhile, additional cross rows of four boards have been placed in sequence upon the beginning end of the conveyor 174, and the conveyor continues its indexed movement until another set of thirty-two boards are in forming position within the machine. With the timing specified herein, two sets of boards may be film coated per minute of operation of the forming machine.

Figures 14, 16:
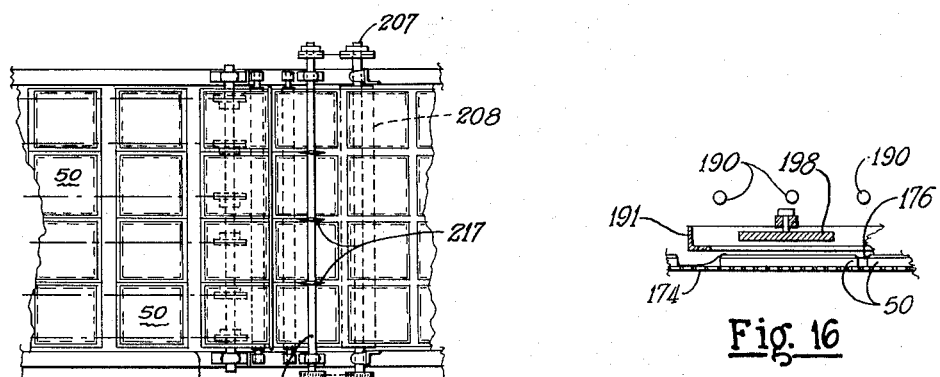
FIGURE 14 is a partial plan view of the trimmer unit of the production line following the discharge end of the vacuum forming machine.
FIGURE 16 is an enlarged vertical section showing elements of the vacuum forming machine associated with a board passing therethrough, taken on the line 16—16 of FIGURE 2.

Should it be desired to prevent the formation of the decorative stippled effect in the film and thus retain the natural smooth surface of the plastic film upon the faces of the boards, this may be accomplished by restricting application of heat to the lattice arrangement of narrow strip portions of the film to be attached to the edges of the boards. One manner of doing this is by loosely mounting shields 198 upon frame 191 as shown in FIGURE 16. These shields are slightly smaller than the boards and are positioned to rest lightly upon the faces of the boards when the frame is brought down into film clamping position. They are thus interposed between the faces of the boards and the heating elements and accordingly insulate the faces from the heat source. The shields 198 may be of light-weight, heat reflecting material.

Alternately, the heating elements may be arranged in a formation lying only above the outlines of the boards, to limit the amount of heat reaching the faces of the boards.

This method of preserving the established character of the film may also be applied to film that has been embossed with a special pebbled, striated or ribbed design. By preventing heat from reaching the areas overlying the main facings of the boards, such a surface decoration may be retained.

With either arrangement, the surrounding portions of the film receive sufficient radiant heat to be softened and drawn into conforming and attaching relation with the side edges of the boards.

Figure 15:
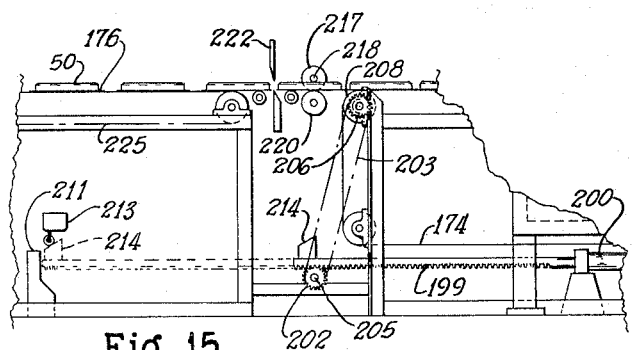
FIGURE 15 is a side elevation of the trimmer unit shown in FIGURE 14.

The step-by-step movement of the conveyor 174 is secured through the reciprocation of rack 199 by the cylinder 200 as illustrated in FIGURE 15. The rack 199 engages a pinion 202 which drives the conveyor through chain 203 running between a sprocket on the pinion shaft 205 and sprocket 206 on the shaft 207 of the conveyor drum 208.

An over-running clutch is associated with pinion shaft 205 to effect movement of chain 203 in a direction only to advance the conveyor. The stop 211 limits the outward movement of rack 199. Near the stop is a decelerating valve 213 which releases pressure from the cylinder 200 when the valve is opened by being abutted by the block 214 of the end of the rack.

Immediately following the discharge of the boards from conveyor 174, the film extending between the boards is slit by a series of disc cutters 217 mounted on shaft 218. The cutters turn with their edges against a steel roller 220 placed beneath the path of the boards.

Following this longitudinal dividing of the film connected boards, a vertically reciprocable shear 222 is brought down during the dwell period of the continued indexed movement to cut the film between adjoining cross-wise rows of the boards. Driven steel rollers support the adjacent boards during this shearing operation. The boards then continue upon the following conveyor 225, the movement of which is synchronized with the step-by-step movement of the conveyor 174, for subsequent operations such as kerfing of side slots, undercutting, further trimming, and packaging.

It may be desired to reestablish the original smooth character of the film on the faces of the boards instead of retaining the stippled design developed in the preferred mode of operation of the vacuum forming machine. This may be done by passing the boards through an oven at a temperature in the region of 170° F. for the particular plastic film described. By this treatment the film is softened and then shrinks on cooling. It is thus drawn smooth and taut across the faces of the boards, and presents a glossy effect in contrast to the light diffusing character of the stippled design.

In review, the features of the boards constructed according to this invention includes a plastic film covering of light gauge with sufficient stiffness to be highly effective for vibratory transmission of sound to the interior of the boards, the film being unattached to the faces of the boards while attached by an air permeable adhesive coating to the edges of the boards. The plastic film covering is further characterized by lying smoothly, without folds, around the corners of the boards and by having a unique stippled contour. In an alternate form of the product of the invention, the film facing of the boards retains its original surface nature which may be either smooth, or embossed with various designs.

Novel features of the subject method includes the softening of a plastic film by heat to a state wherein the film is formable, but not sticky, and the utilization of suction to draw the film over and down the edges of fibrous glass boards, and the use of an air permeable coating of adhesive on the edges of the boards to permit suction therethrough to draw the film into attaching contact with the adhesive.

Another feature of the method involves the use of heated plastic film to activate the adhesive by which it is attached. Other novel aspects of the method are considered to reside in the preserving of the original character of the film structure on the facing of the boards while forming the film around corners and along the edges of the boards. A further feature is the directing of compressed air through the boards following the application of suction, to assure non-attachment of the film to facing areas of the boards.

A supplemental feature is the additional heat treatment to smooth out the film covering after it has been given a stippled shaping in the forming operation. The rapid activation of the adhesive through a primary heat treatment for volatilizing solvent, and a final curing heat application is also important in the practice of the invention.

Various substitutions and modifications may be made in respect to the materials, production equipment and processing steps herein disclosed without departing from the spirit of the invention. Other plastic films such as polyethylene, plasticized polyvinyl chloride, polyvinylidine chloride, nylon, polycarbonate and polyvinyl fluoride may be utilized quite satisfactorily. However, there is likely to be some sacrifice of sound transmission qualities with such alternate materials due to increased thicknesses, greater elasticity, and attachment to the faces of the boards.

Likewise, various thermoplastic, thermosetting and other elastomer adhesives may give good service for joining the plastic film to the edges of the boards. Many of these are available in sprayable liquid form and in formulations to adhere rapidly with little or no heat.

I claim:

1. An acoustical board of bonded mineral fibers having a vibratile film of plastic composition disposed over and unattached to the face of the board and having edge portions stretched smoothly down the side edges and smoothly around the corners of the board, said edge portions of the film being adhered directly to the side edges of the board, said film having an irregularly configured formation on the face of the board with such formation complying with irregularities of and peculiar to the underlying fibrous surface.

2. A method of applying an unattached, vibratile film facing to a porous acoustical board of bonded mineral fibers which comprises applying an air permeable coating of adhesive to the side edges of the board, drawing a thermoplastic film over the face of the porous board, smoothly around the corners and down the side edges thereof, and permanently attaching the plastic sheet through the coating of adhesive on the edges of the board, while the plastic sheet is so drawn, to the side edges of the board, said thermoplastic film being temporarily softened by heat while being drawn over the face and down the side edges of the board, by directing heating energy from a source thereof against the plastic film.

3. An acoustical board of bonded mineral fibers having a main planar face, fully planar sides normal to said face, and a vibratile film of plastic composition disposed over and completely unattached to the full face of the board and having edge portions stretched smoothly and completely down the fully planar sides of the board and smoothly in a single layer, without folds, around the side corners of the board, said edge portions of the film being adhered directly to the planar sides of the board.

4. A method according to claim 2 in which only the portions of the plastic film to be attached to the side edges of the board are softened by heat, whereby preestablished surface configurations in the plastic film in the portion disposed upon the face of the board are not lost through the effect of the heat.

5. A method according to claim 2 in which air suction under the porous board is utilized to draw the film over the face and down the edges of the board, and the air suction is followed by the application of air at a pressure above atmospheric pressure under the porous boards to cause air to pass up through the board and apply pressure against the film to counter any inclination of the heated film to become attached to the face of the board.

6. A method according to claim 2 in which a heat responsive adhesive is first applied to the side edges of the board and the adhesive is activated by heat carried by the plastic film when the film is drawn into contact therewith.

7. A method according to claim 2 in which the plastic film is sufficiently softened by heat to conform with irregularities in the fibrous surface of the board, and thus is given an irregular configuration, but is not softened to such a sticky condition as to become attached to the face of the board.

8. A method according to claim 7 in which the board with the plastic film attached thereto is subjected to an additional heat treatment to resoften the plastic film, and the composition of the plastic film is such that it becomes smooth upon cooling following the additional heat treatment.

9. A method of applying an unattached, vibratile film facing to an acoustical board of bonded mineral fibers comprising moving a continuous row of porous boards in single file, applying a porous coating of adhesive upon a first pair of opposite side edges of the boards, directing solvent volatilizing heat upon the applied coating of adhesive, individually turning the boards ninety degrees to their line of movement, applying a porous coating of adhesive to the remaining second pair of opposite side edges of the boards, directing solvent volatilizing heat upon the coating of adhesive applied to the second pair of opposite edges, collecting the boards slightly spaced from each other in a closely arrayed coplanar group, depositing a thermoplastic film of unplasticized vinyl chloride over the boards of the group, radiating heat at a temperature below the heat sealing range of the film upon the film, applying suction under the boards and drawing the film thereby down upon the faces of the boards and down against the side edges of the boards into attaching contact with the porous coating of adhesive thereon, and setting the film while so drawn.

10. A method of applying an unattached, vibratile film facing to porous acoustical boards of bonded mineral fibers which comprises applying a porous coating of adhesive upon side edges of the boards, collecting the boards slightly spaced from each other in a closely arrayed coplanar group, depositing a thermoplastic film over the boards of the group, radiating film softening heat upon the film, applying suction under the boards and drawing the softened film thereby down upon the faces of the boards and down against the side edges of the boards into attaching contact with the porous coating of adhesive thereon, cooling and setting the film while so drawn, and then separating the boards by cutting the narrow portion of the film extending between adjacent boards.

11. A method according to claim 4 in which the softening by heat is restricted to the said portions of the plastic film by interposing shielding means between the heating energy source and the portion of the plastic film deposed upon the face of the board.

References Cited in the file of this patent

UNITED STATES PATENTS

| | | |
|---|---|---|
| 2,031,900 | Miller | Feb. 25, 1936 |
| 2,045,312 | Roos et al. | June 23, 1936 |
| 2,081,953 | Perry | June 1, 1937 |
| 2,694,233 | Page | Nov. 16, 1954 |
| 2,700,632 | Ackerlind | Jan. 25, 1955 |
| 2,781,077 | Dovidio | Feb. 12, 1957 |
| 2,802,764 | Slayter et al. | Aug. 13, 1957 |
| 2,814,077 | Moncrieff | Nov. 26, 1957 |
| 2,915,427 | Schriner et al. | Dec. 1, 1959 |
| 2,954,838 | Nuorivaara | Oct. 4, 1960 |
| 2,959,242 | Muller et al. | Nov. 8, 1960 |

FOREIGN PATENTS

| | | |
|---|---|---|
| 768,826 | Great Britain | Feb. 20, 1957 |
| 784,503 | Great Britain | Oct. 9, 1957 |